United States Patent
Mondal et al.

(10) Patent No.: US 12,116,481 B2
(45) Date of Patent: Oct. 15, 2024

(54) CURABLE SILICONE-BASED COMPOSITIONS AND APPLICATIONS THEREOF

(71) Applicant: Momentive Performance Materials Inc., Waterford, NY (US)

(72) Inventors: Titash Mondal, Bengal (IN); Murali Mg, Karnataka (IN); Shreedhar Bhat, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 450 days.

(21) Appl. No.: 17/417,429

(22) PCT Filed: Dec. 18, 2019

(86) PCT No.: PCT/US2019/067015
§ 371 (c)(1),
(2) Date: Jun. 23, 2021

(87) PCT Pub. No.: WO2020/139639
PCT Pub. Date: Jul. 2, 2020

(65) Prior Publication Data
US 2022/0056270 A1    Feb. 24, 2022

(30) Foreign Application Priority Data
Dec. 26, 2018    (IN) .............................. 201821049326

(51) Int. Cl.
| | | |
|---|---|---|
| C08L 83/06 | (2006.01) | |
| C08G 77/38 | (2006.01) | |
| C08J 3/20 | (2006.01) | |
| C09D 5/24 | (2006.01) | |
| C09D 5/32 | (2006.01) | |
| C09D 183/08 | (2006.01) | |

(52) U.S. Cl.
CPC .............. *C08L 83/06* (2013.01); *C08G 77/38* (2013.01); *C08J 3/203* (2013.01); *C09D 5/24* (2013.01); *C09D 5/32* (2013.01); *C09D 183/08* (2013.01); *C08J 2383/06* (2013.01); *C08J 2483/08* (2013.01); *C08L 2201/08* (2013.01); *C08L 2203/206* (2013.01); *C08L 2205/025* (2013.01)

(58) Field of Classification Search
CPC .................................................. C08L 2205/025
See application file for complete search history.

(56) References Cited

U.S. PATENT DOCUMENTS

| | | | |
|---|---|---|---|
| 4,545,914 | A | 10/1985 | Graiber et al. |
| 6,210,789 | B1 | 4/2001 | Hanrahan |
| 6,635,354 | B2 | 10/2003 | Bunyan et al. |
| 6,902,688 | B2 | 6/2005 | Narayan et al. |
| 2004/0169162 | A1 | 9/2004 | Xiao et al. |

FOREIGN PATENT DOCUMENTS

| | | | | |
|---|---|---|---|---|
| CN | 105238007 | | 1/2016 | |
| CN | 106816315 | | 6/2017 | |
| EP | 2477224 | | 7/2012 | |
| JP | 63-161014 | | 7/1988 | |
| JP | 103265622 | | 11/1991 | |
| JP | H03265622 | A * | 11/1991 | ............. C08G 59/00 |
| JP | 2002194278 | | 7/2002 | |
| JP | 2005200948 | | 7/2005 | |
| JP | 2010185013 | | 8/2010 | |
| JP | 2010-217741 | | 9/2010 | |
| KR | 20040099821 | | 12/2004 | |
| KR | 20050041213 | | 5/2005 | |
| WO | 2010040139 | | 4/2010 | |

OTHER PUBLICATIONS

Patent Cooperation Treaty (PCT), International Search Report and Written Opinion for Application PCT/US2019/067015 filed Dec. 18, 2019, mailed Mar. 12, 2020, International Searching Authority, EP.

* cited by examiner

*Primary Examiner* — Khanh T Nguyen
(74) *Attorney, Agent, or Firm* — Joseph Waters; McDonald Hopkins LLC

(57) ABSTRACT

A curable composition comprising a polymer A, a polymer B, and one or more fillers, wherein the polymer A includes organic molecules or siloxane molecules comprising two or more epoxy functional groups, and the polymer B includes an organic amine or a hybrid silicone amine.

19 Claims, No Drawings

CURABLE SILICONE-BASED COMPOSITIONS AND APPLICATIONS THEREOF

CROSS REFERENCE TO RELATED APPLICATIONS

The present application claims priority to and the benefit of International Application PCT/US2019/067015 filed on Dec. 18, 2019, which claims priority to and the benefit of India provisional application No. 201821049326 filed on Dec. 26, 2018, the entire disclosure of each of which is incorporated herein by reference in its entirety.

FIELD

The present technology relates to curable silicone-based compositions. In particular, the present technology relates to a curable silicone-based composition comprising an epoxy functionalized polymer, an amine functionalized polymer, and a filler. The composition provides a silicone composite on curing.

BACKGROUND

Silicones are known for their inherent properties such as high thermal stability, flexibility, and/or chemical resistance. Siloxanes are used for electronic or electrical applications based on their properties such as those mentioned above. While it might be desirable to use siloxanes in applications where electrical conductivity may be important, developing electrically conductive siloxane materials is challenging.

Electrical properties can be achieved in silicones by adding fillers into the silicone matrix, and desired conductivity may be achieved by increasing the filler loading in the composition. At higher loadings, however, the filler particles may separate out from the composition over a period of time. Hence, the dispersion of fillers with higher loading in the siloxane matrix is a major challenge. Higher loadings of fillers in the composition may also adversely affect the curing kinetics and processability of the composition. Other common challenges include, but not limited to, variable contact resistance and volume resistivity.

To solve these technical problems, an effort was made to develop curable silicone compositions with desired mechanical and chemical properties.

SUMMARY

Provided is a curable silicone composition that can provide desired adhesion and other mechanical and chemical properties along with good electrical conductivity. In some embodiments, the present technology provides a curable composition comprising a polymer A, a polymer B, and one or more fillers, wherein the polymer A includes organic molecules or siloxane molecules comprising two or more epoxy functional groups, and the polymer B includes an organic amine or a hybrid silicone amine.

In some embodiments, the curable composition comprises polymer A, polymer B, and one or more fillers. The curable silicone composition is an epoxy-amine curing system; and wherein the cured form of the curable composition is a conductive material. The polymer A can be represented by Formula 1:

$$(R)_a(W)_b(R)_{a''} \quad \text{Formula 1}$$

wherein b is greater than 0, a is equivalent to a", and (a+a") is greater than 1. R can be represented by Formula (1a):

$$(L_1)_c[(CH_2)_d(CH_2O)_e X]_f \quad \text{Formula (1a)}$$

wherein $L_1$ is a heteroatom independently selected from oxygen or nitrogen, and wherein c, e can be 0 or greater, and d, f is greater than 0, with the proviso that (d+e) is greater than 0. Further, in Formula (1a), X can be independently selected from any of the functional moieties represented by Formula (1b)

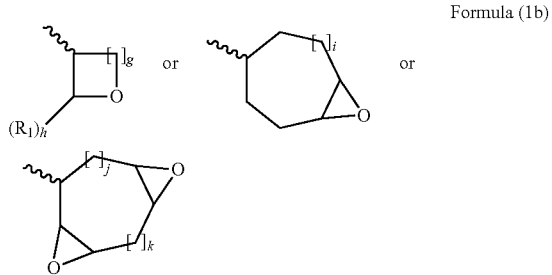

Formula (1b)

wherein g, h, i, can be 0 or greater; j, k can be 0 or greater with the proviso that (j+k) is greater than 0. $R_1$ is selected from aliphatic or aromatic substituted hydrocarbons, or un-substituted hydrocarbons, or fluorinated hydrocarbon having $C_1$-$C_{20}$ carbon atoms and optionally connected to an ester.

W of Formula 1 can be represented by Formula (1c)

$$(Y)_l(Z)_m \quad \text{Formula (1c)}$$

wherein l, m can be zero or greater with the proviso that l+m>0. Further, Y in formula (1c) can be represented by Formula (1d):

$$(M_1)_{n''}(D_1)_n(D_2)_o(T_1)_p(Q_1)_q(M_2)_{n'''} \quad \text{Formula (1d)}$$

wherein n, o, p, q, n", n'" can be zero or greater with the proviso that n+o+p+q+n"+n'">0. Further, $M_1$ of Formula (1d) is represented by Formula (1e):

$$R_2R_3R_4SiO_{1/2} \quad \text{(Formula 1e)}$$

wherein $D_1$ is represented by Formula (1f):

$$R_5R_6SiO_{2/2} \quad \text{Formula (1f)}$$

wherein $D_2$ is represented by Formula (1g):

$$R_7R_8SiO_{2/2} \quad \text{Formula (1g)}$$

wherein $T_1$ is represented by Formula (1h):

$$R_9SiO_{3/2} \quad \text{Formula (1h)}$$

wherein $Q_1$ is represented by Formula (1i):

$$SiO_{4/2} \quad \text{Formula (1i)}$$

wherein $M_2$ is represented by Formula (1j):

$$R_{10}R_{11}R_{12}SiO_{1/2} \quad \text{Formula (1j)}$$

wherein $R_2$-$R_{12}$ can be independently selected from R with the proviso that c=0, or $R_2$-$R_{12}$ can be independently selected from a monovalent cyclic or acyclic, aliphatic or aromatic, substituted or un-substituted hydrocarbon, or a fluorinated hydrocarbon having $C_1$-$C_{20}$ carbon atoms. Z in Formula (1c) can be represented by Formula (1k)

$$(A')_r(B')_s \quad \text{Formula (1k)}$$

wherein r and s can be zero or greater with the proviso that r+s is always greater than zero.

wherein A' can be selected from bis epoxide of structure represented by Formula (1l)

$$R_{13}(J)_{s''}R_{14} \quad \text{Formula (1l)}$$

wherein J can be independently selected from $R_{15}$, $R_{16}$, and s''≥0. Further, $R_{13}$-$R_{16}$ can be independently selected from a monovalent cyclic or acyclic, aliphatic or aromatic, substituted or un-substituted hydrocarbon, or a fluorinated hydrocarbon having $C_1$-$C_{20}$ carbon atoms. B' of Formula (1k) can be selected from structure represented by Formula (1m):

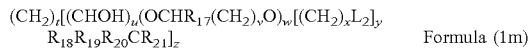
$$(CH_2)_t[(CHOH)_u(OCHR_{17}(CH_2)_vO)_w[(CH_2)_xL_2]_y \\ R_{18}R_{19}R_{20}CR_{21}]_z \quad \text{Formula (1m)}$$

wherein $R_{17}$-$R_{21}$ can be independently selected from a monovalent cyclic or acyclic, aliphatic or aromatic, substituted or un-substituted hydrocarbon, or a fluorinated hydrocarbon having $C_1$-$C_{20}$ carbon atoms. $L_2$ is a heteroatom independently selected from oxygen or nitrogen. Wherein t, u, v, w, x, y, z is an integer with the proviso that t+u+v+w+x+y+z>0.

In some embodiments, the polymer B can be represented by Formula 2:

$$(R')_{a'}(W')_{b'}(R')_{a'} \quad \text{Formula (2)}$$

wherein a', b' can be 0, with the proviso that (a'+b') is greater than 0,

R' can be represented by Formula (2a):

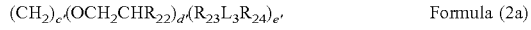
$$(CH_2)_{c'}(OCH_2CHR_{22})_{d'}(R_{23}L_3R_{24})_{e'} \quad \text{Formula (2a)}$$

c', e' is greater than 0 and d' can be zero or greater with the proviso that c'+d'+e'>0, $L_3$ is nitrogen, and $L_3$ is 0 with the proviso that e' is 0. $R_{22}$ can be independently selected hydrogen, monovalent cyclic or acyclic, aliphatic or aromatic, substituted or un-substituted hydrocarbon, or a fluorinated hydrocarbon having $C_1$-$C_{20}$ carbon atoms, $R_{23}$, $R_{24}$ can be independently 0, with the proviso that ($R_{23}$+$R_{24}$) is greater than 0

W' can be represented by Formula (2b):

$$(Y')_{f'}(Z')_{g'} \quad \text{Formula (2b)}$$

f' and g' is 0 or greater, and (f'+g') is greater than 0. Wherein Y' can be represented by Formula 2c:

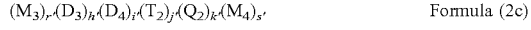
$$(M_3)_{r'}(D_3)_{h'}(D_4)_{i'}(T_2)_{j'}(Q_2)_{k'}(M_4)_{s'} \quad \text{Formula (2c)}$$

h', i', r', s', j' and k' can be zero or greater with the proviso that (h'+i'+r'+s'+j'+k')>0, $M_3$ is represented by Formula (2d):

$$R_{25}R_{26}R_{27}SiO_{1/2} \quad \text{Formula (2d)}$$

$D_3$ is represented by Formula (2e)

$$R_{28}R_{29}SiO_{2/2} \quad \text{Formula (2e)}$$

$D_4$ is represented by Formula (2f):

$$R_{30}R_{31}SiO_{2/2} \quad \text{Formula (2f)}$$

$T_2$ is represented by Formula (2g):

$$R_{32}SiO_{3/2} \quad \text{Formula (2g)}$$

$Q_2$ is represented by Formula (2h)

$$SiO_{4/2} \quad \text{Formula (2h)}$$

$M_4$ is represented by Formula (2i):

$$R_{33}R_{34}R_{35}SiO_{1/2} \quad \text{Formula (2i)}$$

$R_{25}$-$R_{35}$ can be independently selected from R', or hydrogen, hydroxyl radical, a monovalent cyclic or acyclic, aliphatic or aromatic, substituted or un-substituted hydrocarbon, or a fluorinated hydrocarbon having $C_1$-$C_{20}$ carbon atoms.

Z' of Formula (2b) can be represented by Formula (2j):

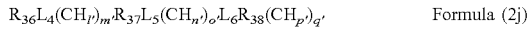
$$R_{36}L_4(CH_{l'})_{m'}R_{37}L_5(CH_{n'})_{o'}L_6R_{38}(CH_{p'})_{q'} \quad \text{Formula (2j)}$$

Z' of Formula (2j) can be linear or cyclic. In Formula (2j), $R_{36}$-$R_{38}$ can be independently selected from hydrogen, or a monovalent cyclic or acyclic, aliphatic or aromatic, substituted or un-substituted hydrocarbon, or a fluorinated hydrocarbon having 1-20 carbon atoms or halogen optionally connected via heteroatoms, $L_4$, $L_5$, or $L_6$ is a heteroatom independently selected from oxygen or nitrogen, $L_4$, $L_5$, or $L_6$ can be 0 or greater, with the proviso that ($L_4$+$L_5$+$L_6$) is greater than 0, and l', m', n', o', p', q' is an integer with the proviso that l'+m'+n'+o'+p'+q'>0.

These and other embodiments and aspects are further understood with reference to the following detailed description.

DETAILED DESCRIPTION

In the following specification and the claims, which follow, reference will be made to a number of terms, which shall be defined to have the following meanings.

The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

As used herein, the terms "aromatic," "aromatic group," and "aromatic radical" are used interchangeably and refer to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthracenyl groups (n=3) and the like. The aromatic radical may also include nonaromatic components. For example, a benzyl group is an aromatic radical which comprises a phenyl ring (the aromatic group) and a methylene group (the nonaromatic component). Similarly, a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a C7 aromatic radical comprising a methyl group, the methyl group being a functional group which is an alkyl group. Similarly, the 2-nitrophenyl group is a C6 aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC(CF$_3$)$_2$PhO—), 4-chloromethylphen-1-yl, 3-trifluorovinyl-2-thienyl, 3-trichloromethylphen-1-yl (i.e., 3-CCl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphen-1-yl, 4-vinylphen-1-yl, vinylidenebis(phenyl), and the like. The term "a C3-C10 aromatic radical" includes aromatic radicals containing at least three but no more than 10 carbon atoms. The aromatic radical 1-imidazolyl (C$_3$H$_2$N$_2$—) represents a C3 aromatic radical. The benzyl radical (C$_7$H$_7$—) represents a C7 aromatic radical. In one or more embodiments, the aromatic groups may include C6-C30 aromatic groups, C10-C30 aromatic groups, C15-C30 aromatic groups, C20-C30 aromatic groups. In some specific embodiments, the aromatic groups may include C3-C10 aromatic groups, C5-C10 aromatic groups, or C8-C10 aromatic groups.

As used herein the terms "cycloaliphatic," "cycloaliphatic group," and "cycloaliphatic radical" are used interchangeably and refer to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group (C$_6$H$_{11}$CH$_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a C6 cycloaliphatic radical comprising a methyl group, the methyl group being a functional group which is an alkyl group. Similarly, the 2-nitrocyclobut-1-yl radical is a C4 cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —C$_6$H$_{10}$C(CF$_3$)$_2$C$_6$H$_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., CH$_3$CHBrCH$_2$C$_6$H$_{10}$O—), and the like. Further examples of cycloaliphatic radicals include 4-allyloxycyclohex-1-yl, 4-aminocyclohex-1-yl (i.e., H$_2$C$_6$H$_{10}$—), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC$_6$H$_{10}$(CH$_2$)$_6$C$_6$H$_{10}$O—), 4-hydroxymethylcyclohex-1-yl (i.e., 4-HOCH$_2$C$_6$H$_{10}$—), 4-mercaptomethylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1-yloxy (2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethylsilylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis(cyclohexyl), and the like. The term "a C3-C10 cycloaliphatic radical" includes cycloaliphatic radicals containing at least three but no more than 10 carbon atoms. The cycloaliphatic radical 2-tetrahydrofuranyl (C$_4$H$_7$O—) represents a C4 cycloaliphatic radical. The cyclohexylmethyl radical (C$_6$H$_{11}$CH$_2$—) represents a C7 cycloaliphatic radical. In some embodiments, the cycloaliphatic groups may include C3-C20 cyclic groups, C5-C15 cyclic groups, C6-C10 cyclic groups, or C8-C10 cyclic groups.

As used herein the term "aliphatic," "aliphatic group," and "aliphatic radical" are used interchangeably and refer to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkenyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C6 aliphatic radical comprising a methyl group, the methyl group being a functional group which is an alkyl group. Similarly, the 4-nitrobut-1-yl group is a C4 aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals include allyl, aminocarbonyl (i.e., —$CONH_2$), carbonyl, 2,2-dicyanoisopropylidene (i.e., —$CH_2C(CN)_2CH_2$—), methyl (i.e., —$CH_3$), methylene (i.e., —$CH_2$—), ethyl, ethylene, formyl (i.e., —CHO), hexyl, hexamethylene, hydroxymethyl (i.e., —$CH_2OH$), mercaptomethyl (i.e., —$CH_2SH$), methylthio (i.e., —$SCH_3$), methylthiomethyl (i.e., —$CH_2SCH_3$), methoxy, methoxycarbonyl (i.e., $CH_3OCO$—), nitromethyl (i.e., —$CH_2NO_2$), thiocarbonyl, trimethylsilyl (i.e., $(CH_3)_3Si$—), t-butyldimethylsilyl, 3-trimethyoxysilylpropyl (i.e., $(CH_3O)_3SiCH_2CH_2CH_2$—), vinyl, vinylidene, and the like. By way of further example, a C1-C10 aliphatic radical contains at least one but no more than 10 carbon atoms. A methyl group (i.e., $CH_3$—) is an example of a C1 aliphatic radical. A decyl group (i.e., $CH_3(CH_2)_9$—) is an example of a C10 aliphatic radical. In one or more embodiments, the aliphatic groups or aliphatic radical may include, but is not limited to, a straight chain or a branched chain hydrocarbon having 1-20 carbon atoms, 2-15 carbon atoms, 3-10 carbon atoms, or 4-8 carbon atoms.

The present technology provides curable silicone-based compositions and the use of such compositions in a variety of applications. Selection of polymer A, polymer B, and one or more fillers as described herein in the composition provides a hybrid composite material with multifaceted properties. Further, the present compositions allow for the use of relatively high loadings of fillers in the silicone matrix without affecting the curing and processing conditions of the compositions. The presence of non-silicone organic units can be employed to provide additional benefits to the overall properties of the hybrid silicone composites. The curable silicone composition is an epoxy-amine curing system; and wherein the cured form of the curable composition is a conductive material.

One or more embodiments of the present technology provides, a curable composition comprising a polymer A, a polymer B, and one or more fillers. Polymer A comprises an organic molecule or a siloxane molecule comprising epoxy functional groups. Polymer B comprises an organic molecule, a siloxane molecule, or a hybrid-siloxane molecule comprising amine functional groups. The curable composition of these embodiments may form hybrid silicone composites on curing. The hybrid silicone composite may form by epoxy-amine curing.

In some embodiments, the polymer A includes organic molecules comprising one or more epoxy functional groups, siloxane molecules comprising one or more epoxy functional groups, or a combination thereof. In some embodiments, the polymer A comprises organic molecules comprising one or more epoxy functional groups. The epoxy functionalized organic molecules (non-siloxane) are referred to hereinafter as "organic epoxy." In some other embodiments, the polymer A comprises siloxane molecules comprising one or more epoxy functional groups. The epoxy functionalized siloxane molecules are referred to hereinafter as "siloxane epoxy". In some embodiments, the siloxane epoxy may be a linear polymer chain, wherein the epoxy functional groups are attached to the terminal positions of the siloxane linear polymer. In some other embodiments, the siloxane epoxy may be a branched-polymer, wherein the epoxy functional groups are attached to one or more pendant positions of the siloxane branched polymer.

Polymer A may be selected from a compound of Formula 1:

$(R)_a(W)_b(R)_{a''}$  Formula 1 wherein a is equivalent to a", and can be 0 or greater, and b is greater than 0. R can be represented by Formula (1a):

$(L_1)_c[(CH_2)_d(CH_2O)_eX]_f$  Formula (1a)

wherein $L_1$ is a heteroatom independently selected from oxygen or nitrogen, and wherein c, e can independently be 0 or greater, and d, f is independently greater than 0, with the proviso that (d+e) is greater than 0. Further, in Formula (1a), X can be independently selected from any of the functional moieties represented by Formula (1b)

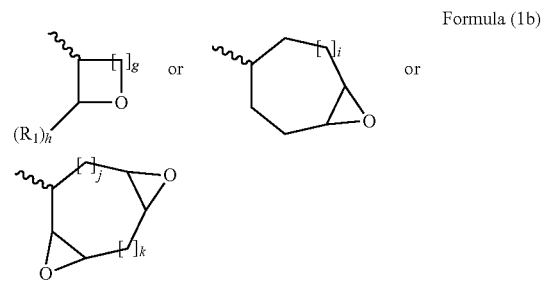

wherein g, h, i can independently be 0 or greater; j, k can independently be 0 or greater with the proviso that (j+k) is greater than 0. R1 is selected from an aliphatic or aromatic, substituted or un-substituted hydrocarbon, or a fluorinated hydrocarbon having $C_1$-$C_{20}$ carbon atoms and optionally connected to an ester.

Now, W of formula 1 can be represented by Formula (1c)

$(Y)_l(Z)_m$  Formula (1c)

wherein l, m can independently be zero or greater with the proviso that l+m>0. Further, Y in formula (1c) can be represented by Formula (1d):

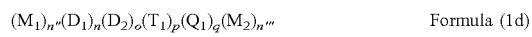
$(M_1)_{n''}(D_1)_n(D_2)_o(T_1)_p(Q_1)_q(M_2)_{n'''}$  Formula (1d)

wherein n, o, p, q, n", n''' can be zero or greater with the proviso that n+o+p+q+n"+n'''>0. Further, $M_1$ of Formula (1d) is represented by Formula (1e):

$R_2R_3R_4SiO_{1/2}$  Formula (1e)

wherein $D_1$ is represented by Formula (1f):

$R_5R_6SiO_{2/2}$  Formula (1f)

wherein $D_2$ is represented by Formula (1g):

$R_7R_8SiO_{2/2}$  Formula (1g)

wherein $T_1$ is represented by Formula (1h):

$R_9SiO_{3/2}$  Formula (1h)

wherein $Q_1$ is represented by Formula (1i):

$SiO_{4/2}$  Formula (1i)

wherein $M_2$ is represented by Formula (1j):

$R_{10}R_{11}R_{12}SiO_{1/2}$  Formula (1j)

wherein $R_2$-$R_{12}$ can be independently selected from R when c=0, or $R_2$-$R_{12}$ can be independently selected from a monovalent cyclic or acyclic, aliphatic or aromatic, substituted or un-substituted hydrocarbon, or a fluorinated hydrocarbon having $C_1$-$C_{20}$ carbon atoms. Further, Z in Formula (1c) can be represented by Formula (1k)

$$(A')_r(B')_s \qquad \text{Formula (1k)}$$

wherein r and s can be zero or greater with the proviso that (r+s) is always greater than zero A' can be selected from structure represented by Formula (1l)

$$R_{13}(J)_{s''}R_{14} \qquad \text{Formula (1l)}$$

wherein J can be independently selected from $R_{15}$, $R_{16}$, and s''≥0, $R_{13}$-$R_{16}$ can be zero or independently selected from a monovalent cyclic or acyclic, aliphatic or aromatic, substituted or un-substituted hydrocarbon, or a fluorinated hydrocarbon having $C_1$-$C_{20}$ carbon atoms, B' of Formula (1k) can be selected from the structure represented by Formula (1m)

$$(CH_2)_t[(CHOH)_u((CHR_{17})(CH_2)_vO))_w((CH2)_xL_2)_yR_{18}R_{19}R_{20}CR_{21}]_z \qquad \text{Formula (1m)}$$

wherein $R_{17}$-$R_{21}$ can be independently selected from a monovalent cyclic or acyclic, aliphatic or aromatic, substituted or un-substituted hydrocarbon, hydrogen, or a fluorinated hydrocarbon having $C_1$-$C_{20}$ carbon atoms, $L_2$ is a heteroatom independently selected from oxygen or nitrogen, and t, u, v, w, x, y, z is an integer with the proviso that t+u+v+w+x+y+z>0.

In embodiments, a, a'' are 1, b is 1; c, d, e, f in R are independently 1, 1-10, 1-20, 5-10 respectively. g, h, i, j, k, are independently 0-1, 0-5, or 0-10. l, m in W are independently 0-5. n'', n, o, p, q, n''', in Y are independently 0, 1-5, 5-10, or 10-20. r, s in Z are independently 0, 1-5, 5-10, or 10-20. s'' in A' is 0-5 or 0, 1-10. t, u, v, w, x, y, z in B' are independently 0, 1-2, 1-5, 5-10, or 10-20

In one or more embodiments, polymer A can be represented by the following structure, wherein n can be 1-10:

In one or more embodiments, polymer A can further be represented by the following structure, wherein n, o can be 1-10:

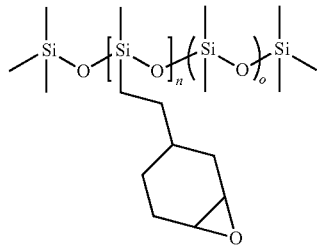

For an exemplary embodiment, when n=10, m=15, polymer A can be represented by:

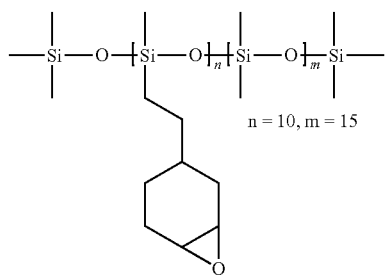

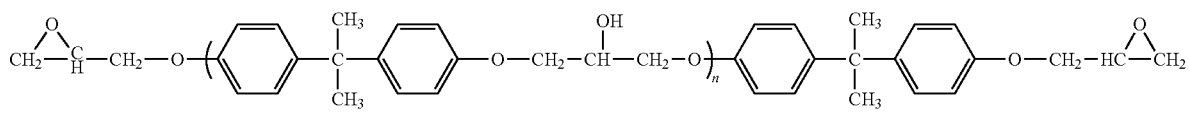

For example when n=1 polymer A can be represented by:

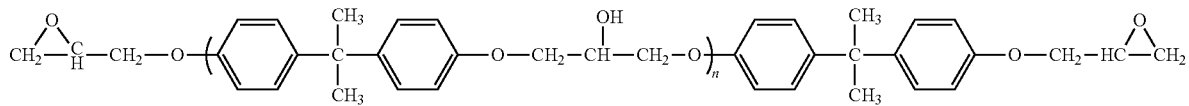

For an exemplary embodiment, when n=27, polymer A can be represented by:
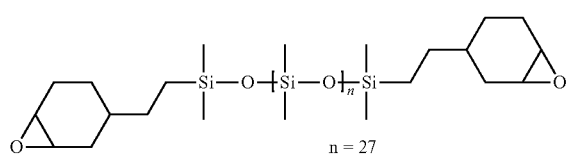
n = 27
For an exemplary embodiment, polymer A can also be represented by the following structures:
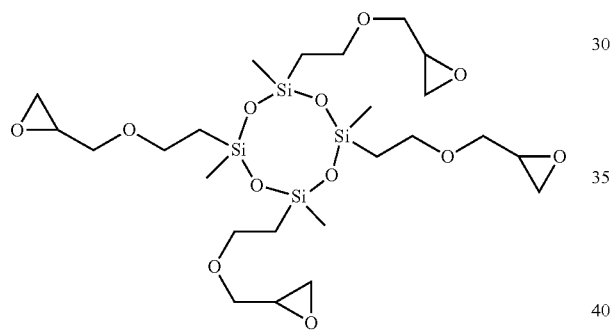
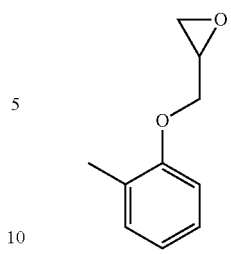
For an exemplary embodiment, when n, o can be 1-30, 1-40, or 1-50, polymer A can be represented by:
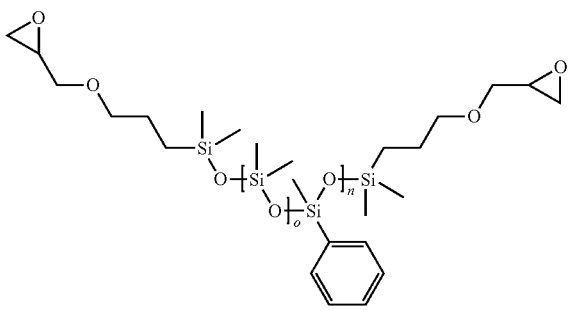
For an exemplary embodiment, polymer A can also be represented by the following structures:
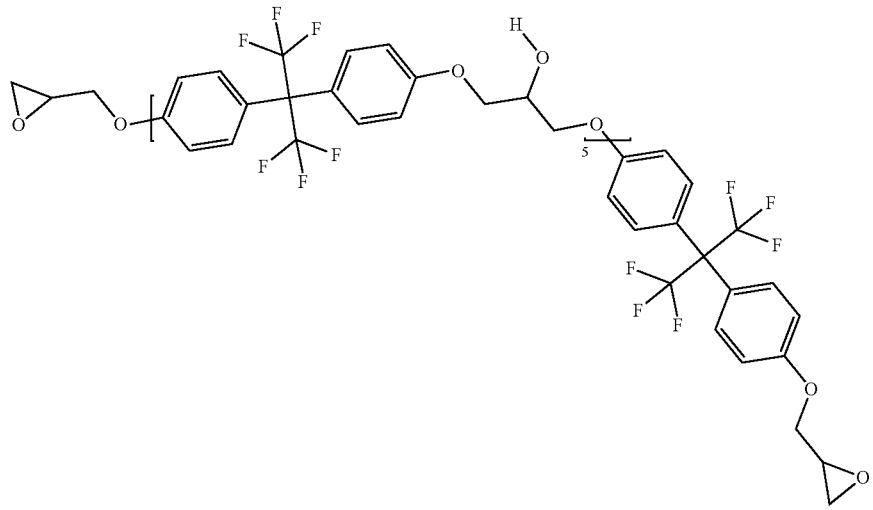

In one or more embodiments, the polymer B comprises an organic amine, a silicone amine, or a combination thereof. In some embodiments, the polymer B comprises both an organic unit and a silicone unit with two or more amine functional groups. In some embodiments, the silicone amine is a hybrid silicone amine. The hybrid silicone amine generally includes a combination of one or more silicone units comprising two or more amine functional groups and one or more non-silicone (organic) units. In such embodiments of the hybrid silicone amine, each of the silicone units and each of the organic units may be arranged in an alternate fashion. In another embodiment of the hybrid silicone amine, two or more silicone units are separated by one or more organic units. In some embodiments, the amine functional groups may be in the terminal positions. In some other embodiments, the amine functional groups may be in the pendent position of the siloxane polymer chain of the silicone-amine, or hybrid silicone amine polymer.

The polymer B of the curable composition can, in embodiments, be represented by a compound of Formula 2:

(R')$_{a'}$(W')$_{b'}$(R')$_{a'}$    Formula (2)

wherein a', b' can be 0 or greater, and (a'+b') is greater than 0,

R' can be represented by Formula (2a):

(CH$_2$)$_{c'}$(OCH$_2$CHR$_{22}$)$_{d'}$(R$_{23}$L$_3$R$_{24}$)$_{e'}$    Formula (2a)

c', e' is greater than 0 and d' can be zero or greater with the proviso that c'+d'+e'>0, L$_3$ is nitrogen, and L$_3$ can be null with the proviso that e' is 0; R$_{22}$-R$_{24}$ can be independently selected from hydrogen, monovalent cyclic or acyclic, aliphatic or aromatic, substituted or un-substituted hydrocarbon, or a fluorinated hydrocarbon having C$_1$-C$_{20}$ carbon atoms, R$_{23}$, R$_{24}$ can be independently 0 or greater, with the proviso that (R$_{23}$+R$_{24}$) is greater than 0, W' of Formula 2 can be represented by Formula (2b):

(Y')$_{f'}$(Z')$_{g'}$    Formula (2b)

f' and g' is 0 or greater, and (f'+g') is greater than 0. Y' can be represented by Formula 2c:

(M$_3$)$_{r'}$(D$_3$)$_{h'}$(D$_4$)$_{i'}$(T$_2$)$_{j'}$(Q$_2$)$_{k'}$(M$_4$)$_{s'}$    Formula (2c)

h', i', r', s', j' and k' can be zero or greater with the proviso that (h'+i'+r'+s'+j'+k')>0.

M$_3$ is represented by Formula (2d):

R$_{25}$R$_{26}$R$_{27}$SiO$_{1/2}$    Formula (2d)

D$_3$ is represented by Formula (2e):

R$_{28}$R$_{29}$SiO$_{2/2}$    Formula (2e)

D$_4$ is represented by Formula (2f):

R$_{30}$R$_{31}$SiO$_{2/2}$    Formula (2f)

T$_2$ is represented by Formula (2g):

R$_{32}$SiO$_{3/2}$    Formula (2g)

Q$_2$ is represented by Formula (2h):

SiO$_{4/2}$    Formula (2h)

M$_4$ is represented by Formula (2i):

R$_{33}$R$_{34}$R$_{35}$SiO$_{1/2}$    Formula (2i)

wherein R$_{25}$-R$_{35}$ can be independently selected from R', or hydrogen, hydroxyl, a monovalent cyclic or acyclic, aliphatic or aromatic, substituted or un-substituted hydrocarbon, or a fluorinated hydrocarbon having C$_1$-C$_{20}$ carbon atoms.

Z' of Formula (2b) can be represented by Formula (2j):

R$_{36}$L$_4$(CH$_{l'}$)$_{m'}$R$_{37}$L$_5$(CH$_{n'}$)$_{o'}$L$_6$R$_{38}$(CH$_{p'}$)$_{q'}$    Formula (2j)

Z' of Formula (2j) can be linear or cyclic, wherein R$_{36}$-R$_{38}$ in Formula (2j) can be independently selected from R' or hydrogen, or a monovalent cyclic or acyclic, aliphatic or aromatic, substituted or un-substituted hydrocarbon, or a fluorinated hydrocarbon having C$_1$-C$_{20}$ carbon atoms or halogen optionally connected via heteroatoms, L$_4$, L$_5$, or L$_6$ is a heteroatom independently selected from oxygen, or nitrogen, L$_4$, L$_5$, or L$_6$ can be 0 or greater, with the proviso that (L$_4$+L$_5$+L$_6$) is ≥0, and l', m', n', o', p', q' is an integer with the proviso that l'+m'+n'+o'+p'+q'>0.

In embodiments, a', b' are 1, c', e', d' in R' are independently 1-10, 1-10, 0-10 respectively. f', g' in W are independently 0-10. h', i', r', s', j', k' in Y' are independently 0-10. l', m', n', o', p', q' in Z' are independently 0-10.

In one or more embodiment, polymer B can be represented by the following, wherein n can be 1-5, 1-10, 1-20.

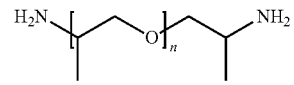

In formula 2, a' is 0, while b' 1. while in Formula 2a, c' and d' are 0 while e' is 2. In formula 2b, f' is 0 while g'1. In formula 2j, R$_{36}$ is R' with the constraint that in R' is d' is 3 with R$_{22}$ as methyl, while c' and e' are 0. Further in formula 2j, L4, L5 and L6 are null, while i', m', n', o' are 1 and R$_{37}$ is methyl. R$_{38}$ is selected from R' with a constraint that c', d' and e' are 0.

In one or more embodiment, polymer B can be represented by the following structures, wherein m or n can be 1-5, 1-10, or 1-20.

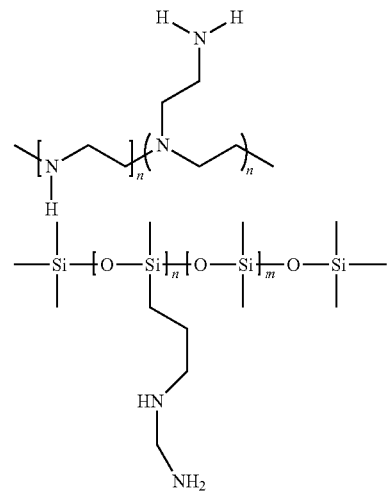

Various weight ratios of polymer A and polymer B are added to the composition to achieve desired properties for the hybrid composite. In one or more embodiments, the curable composition comprises the polymer A in a range from about 5% to 60%. In some embodiments, the curable composition comprises the polymer A in a range from about 8% to 50%. In some embodiments, the curable composition comprises the polymer A in a range from about 10% to 60%.

In some embodiments, the curable composition comprises the polymer A in a range from about 20% to 50%. In some embodiments, the curable composition comprises the polymer A in a range from about 15% to 60%. In some embodiments, the curable composition comprises the polymer A in a range from about 25% to 50%.

In some embodiments, the curable composition comprises the polymer A in a range from about 5% to 25%. As used herein, percentage of polymer A is the percent by weight based on the total weight of the composition. In one or more embodiments, the curable composition comprises the polymer B in a range from about 5% to 30%. In some embodiments, the curable composition comprises the polymer B in a range from about 8% to 30%. In some embodiments, the curable composition comprises the polymer B in a range from about 10% to 20%. In some embodiments, the curable composition comprises the polymer B in a range from about 7% to 20%.

In some embodiments, the curable composition comprises the polymer B in a range from about 5% to 20%. In some embodiments, the curable composition comprises the polymer B in a range from about 8% to 18%. In some embodiments, the curable composition comprises the polymer B in a range from about 5% to 15%. As used herein, percentage of polymer B is the percent by weight based on the total weight of the composition.

As noted, the composition comprises one or more fillers, wherein the fillers include, but are not limited to, alumina, silicon, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, graphene, metal coated graphite, metal coated graphene, aluminum powder, copper powder, bronze powder, brass powder, fibers or whiskers of carbon, graphite, silicon carbide, silicon nitride, alumina, aluminum nitride, silver, zinc oxide, carbon nanotubes, boron nitride nanosheets, zinc oxide nanotubes, black phosphorous, silver coated aluminum, silver coated glass, silver plated aluminum, nickel plated silver, nickel plated aluminum, carbon black of different structures, Monel mesh and wires, or combinations of two or more thereof.

In one or more embodiments, the fillers include graphite, nickel-coated graphite, silver, copper or combinations thereof. In one or more embodiments, the fillers include graphite, nickel-coated graphite, or a combination thereof. In one embodiment, the filler is a nickel-coated graphite.

Various weight ratios of fillers are added to the composition to achieve desired properties for the hybrid composite. In one or more embodiments, the curable composition comprises the fillers in a range from about 5% to 80%. In some embodiments, the curable composition comprises the fillers in a range from about 20% to 80%. In some embodiments, the curable composition comprises the fillers in a range from about 20% to 60%. In some embodiments, the curable composition comprises the fillers in a range from about 30% to 80%. In some embodiments, the curable composition comprises the fillers in a range from about 30% to 60%. In some embodiments, the curable composition comprises the fillers in a range from about 50% to 80%. In some embodiments, the curable composition comprises the fillers in a range from about 60% to 80%. The amount of filler described herein refers to the percentage by weight based on the total weight of the composition.

In some embodiments, the curable composition further comprises adhesion promoters selected from a trialkoxy epoxy silane, a trialkoxy primary amino silane, a combination of a primary and a secondary amine containing trialkoxy silane, a tris-(trialkoxy) isocyanurate based silane, an alkylthiocarboxylated trialkoxy silane, or a combination of two or more thereof.

In some embodiments, the curable composition further comprises a reactive diluent. The reactive diluent may include, but is not limited to, substituted glycidyl ether. The reactive diluent may include one or more solvents. Suitable solvents may include, but are not limited to, liquid hydrocarbons or silicone fluids. The hydrocarbon solvent may include a hexane or heptane, a silicone fluid may include polydiorganosiloxane.

In some embodiments, the curable composition further comprises a rheology modifier or flow additives. The rheology modifier may include, but is not limited to, tetrahydrolinalool, thermoplastic resin and polyvinyl acetals. The flow additives may include, but are not limited silicone fluids, or acrylated copolymers.

In some embodiment, the silicone multi-epoxy compounds of different chain length were synthesized by re-equilibrating Silforce* UV9315 (Momentive Performance Materials) with appropriate amount of octamethylcyclotetrasiloxane under basic condition using tetra butyl ammonium hydroxide at 90° C. In some embodiment, the silicone multi-epoxy compounds (pendant) of different chain length were synthesized by hydrosilylation of vinyl cyclohexene oxide with appropriate amount of silicone fluid having hydride in the pendant using Karstedt catalyst at 75° C.

In some embodiment, Polymer A, Polymer B and filler(s) are mixed together with respect to their epoxy and amine equivalent weight. The mixture is homogenized at 2350 rpm using Hauschild speedmixer for 120 seconds. In one or more embodiments, the composition is cured by epoxy-amine curing between 40-80° C. In one embodiment, the homogenized mixture is cured at 60° C. in a hot air oven.

In some embodiment, the application of the cured material and its end use is in coatings, adhesive, sealants, electrodes, ink, thermally conductive material, electrically conductive material, sensors, actuators, heating pad, anti-bacterial packaging material, conductive plastic, electromagnetic shielding material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

EXAMPLES

Example 1: Synthesis of Multi-Epoxy Siloxane (Polymer A)

10 g of Silforce* UV 9315 (Momentive Performance Materials) was charged in a three necked round bottom flask. To it, 130 g of D4 was added. Further to it, 2500 ppm of tetra butyl ammonium hydroxide was charged in. The reaction mixture was heated gently from room temperature to 90° C. and high vacuum at 1 mbar was applied for first 30 minutes. Then vacuum was switched off and was allowed to heat under stirring for 6 h at 90° C. until the solid content of 93% was achieved. The content was heated to 135° C. to deactivate the catalyst and strip off excess D4. The product (A3) was further isolated and stored.

Example 2: Synthesis of Pendant Epoxy Siloxane (Polymer A)

Based on the degree of polymerization, siloxane-based silicone polymer having ten pendant hydrogens, fifteen SiOMe$_2$ units and SiMe$_3$ capping was taken in a three neck round bottom flask and kept for stirring at ≥75° C. At desired temperature 10 ppm Pt-catalyst was added into the round bottom flask and allowed for homogenous mixing. Then 4-vinyl-1-cyclohexane 1, 2-epoxide was taken in a dropping funnel and allowed for dropwise addition in to the reaction mixture of hydride and catalyst. The vinyl to hydride ration was taken to be 1.05:1. The product A4 was further isolated and stored.

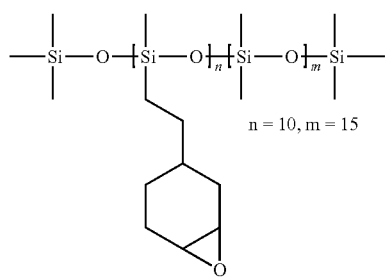

Structure I n = 10, m = 15

Example 3: Synthesis of Terminal Epoxy Siloxane (Polymer A)

Based on the degree of polymerization, siloxane-based silicone polymer having bis terminal hydrogens, twenty seven SiOMe$_2$ units was taken in a three neck round bottom flask and kept for stirring at ≥75° C. At desired temperature 10 ppm Pt-catalyst was added into the round bottom flask and allowed for homogenous mixing. Then 4-vinyl-1-cyclohexane 1, 2-epoxide was taken in a dropping funnel and allowed for dropwise addition in to the reaction mixture of hydride and catalyst. The vinyl to hydride ration was taken to be 1.05:1. The product A5 was further isolated and stored.

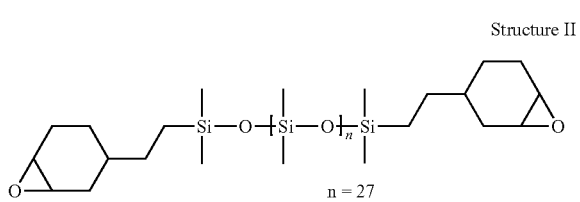

Structure II n = 27

Example 4: Synthesis of Cyclic Epoxy Siloxane (Polymer A)

Based on the degree of polymerization tetramethylcyclotetrasiloxane taken in a three neck round bottom flask and kept for stirring at ≥75° C. At desired temperature 10 ppm Pt-catalyst was added into the round bottom flask and allowed for homogenous mixing. Then allyl glycidyl ether was taken in a dropping funnel and allowed for dropwise addition in to the reaction mixture of hydride and catalyst. The vinyl to hydride ration was taken to be 1.05:1. The product A6 was further isolated and stored.

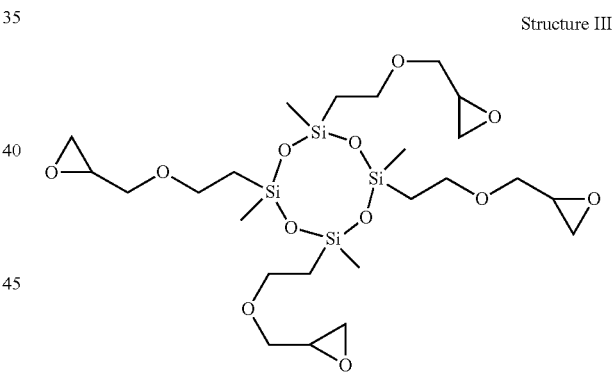

Structure III

Table 1 provides the descriptions and the sources of different materials used in the formulation in addition to the aforementioned structures (1-III).

TABLE 1

| Description and the source of materials | | |
|---|---|---|
| Polymer A (Material)/Label* | Description | Source |
| SILFORCE* UV 9315 | Pendant/Terminal cylcohexane epoxy containing PDMS | Momentive Performance Materials, Leverkusen, Germany |
| Epon 828 (A1) | Bisphenol A based bis epoxy | Hexion, USA |
| Heloxy 62 (A2) | Mono epoxy compound | Hexion, USA |
| A3 | Multi epoxy siloxane | In house synthesized |
| A4 | Structure I | In house synthesized |
| A5 | Structure II | In house synthesized |
| A6 | Structure III | In house synthesized |

TABLE 1-continued

| Description and the source of materials | | |
|---|---|---|
| Silquest* A-Link 187 (A7) | Gamma-Glycidoxy Propyl trimethoxy Silane | Momentive Performance Materials, USA |

| Polymer B (Material)/Label* | Description | Source |
|---|---|---|
| Jeffamine D230 (B1) | Bis amino terminated Polyether | Huntsman, Singapore |
| F42-703 NE (B2)) | Pendant amino siloxane | Momentive Performance Materials, Chennai |
| Polyethylenimine, branched (B3) | Multi amino compound | Sigma Aldrich, Germany |

| Filler | Description | Source |
|---|---|---|
| Nickel Coated Graphite (f1) | Mesh size 100 with carbon to nickel ratio of 60:40 | Fischer Scientific, USA |
| Graphite (f2) | Nanopowder | Sigma Aldrich, India |
| Iron Oxide (f3) | Nanopowder < 50-100 nm | Sigma Aldrich, USA |

**Label- is used herein for describing the formulations.
*Momentive' commercial product Preparation of Various Formulations The polymer A comprising one or more epoxy functional groups and polymer B comprising two or more amine functional groups were used to prepare hybrid silicone composites in presence of one or more fillers. Here, amine functionality could be in either terminal or in pendent of the siloxane molecule. The fillers of various weight ratios were added to the mixture of polymer A and polymer B. After mixing the polymer A, polymer B and the fillers, was cured at 60° C. Both epoxy functional polymers A and amine functional polymers B were added in equi-molar proportion based on their equivalent weight. The details of the various formulations are described below in Table 1. For different formulations, different types of silicone epoxy, organic epoxy, silicone amine, hybrid silicone amine, and organic amine, and different types of fillers were selected. For example, in formulations 1 and 2, EPON 828 (Hexion), which is an organic-bis-epoxy molecule, was used as polymer A, with pendant amino silicone as polymer B in the presence of nickel-coated graphite as a filler. Similarly, for formulations 3 to 6, Heloxy 62 (Hexion), which is an organic-mono-epoxy molecule, was used along with EPON 828 as polymer A, with pendant amino silicone as polymer B in the presence of nickel-coated graphite as a filler. In formulation 7 and 8, trimethoxy epoxysilane was added as an adhesion promoter to the components like EPON 828, pendant amino silicone, and nickel-coated graphite. In formulations 9 and 10, EPON 828 was used as polymer A, with pendant amino silicone as polymer B in the presence of graphite as a filler. In formulation 11, Vinyl cyclohexane multi-epoxy PDMS (SE2) was used as polymer A, with Jeffamine D230 (Huntsman) as polymer B in the presence of nickel-coated graphite as a filler. Various formulations are presented in Table 2. Different types of epoxy functionalized silicone, epoxy functionalized organic polymer, and organic amine, or silicone amine were used, which are represented below.

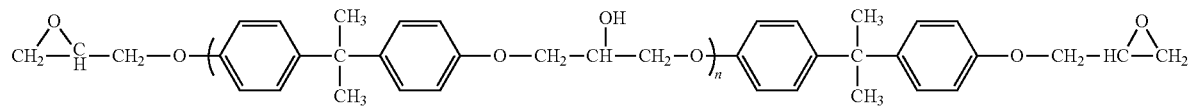

EPON 828

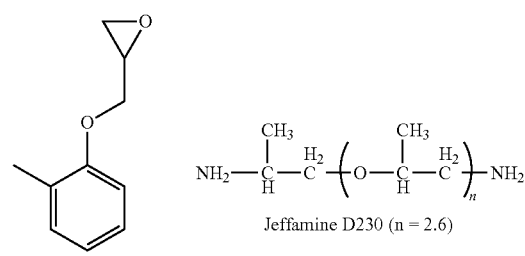

Jeffamine D230 (n = 2.6)

Heloxy 62

The details of the various formulations are described below in Table 2. For different formulations, different types of silicone epoxy, organic-epoxy, hybrid silicone epoxy, silicone amine and hybrid silicone amine were selected.

TABLE 2

Representative examples and their compositions

| Formulation No. | Polymer A Label | Polymer A Percentage in formulation | Polymer B Label | Polymer B Percentage in formulation | Filler Label | Filler Percentage in formulation |
|---|---|---|---|---|---|---|
| F1 | A1 | 30 | B2 | 10 | f1 | 60 |
| F2 | A1, A2 | 13, 9 | B2 | 8 | f1 | 70 |
| F3 | A1, A2 | 18, 13 | B2 | 8 | f1 | 60 |
| F4 | A1, A2 | 8, 13 | B2 | 9 | f1 | 70 |
| F5 | A1, A2 | 9, 22 | B2 | 9 | f1 | 60 |
| F6 | A1, A7 | 25, 7.5 | B2 | 7.5 | f1 | 60 |
| F7 | A1 | 52.5 | B2 | 17.5 | f2 | 30 |
| F8 | A1 | 48.5 | B2 | 14.5 | f2 | 37 |
| F9 | A3 | 28 | B1 | 2 | f1 | 70 |
| F10 | A4 | 23.2 | B1 | 6.8 | f1 | 70 |
| F11 | A1, A5 | 20.9, 2.3 | B2 | 6.8 | f1, f3 | 68, 2 |
| F12 | A1, A6 | 18.2, 4.54 | B2 | 6.8 | f1 | 70 |
| F13 | A1, A4 | 18, 5.2 | B2, B3 | 6, 0.8 | f1 | 70 |

Physico Mechanical Property Testing Methodology

Electrical conductivity measurement: The electrical resistivity measurement for the samples of different forms were done as per the ASTM D257 standard using the four-probe instrument. The obtained electrical resistivity value was transposed to electrical conductivity. The lap shear of the developed formulations was measured using the ASTM D3163 standard. Instron instrument was used for the same. Hardness measurement: The hardness of the developed composites was measured according to ASTM D2240 standard.

TABLE 3

Properties of the representative formulations are provided here:

| Formulation | Electrical Conductivity (S/cm) | Hardness | Lap Shear Strength (MPa) |
|---|---|---|---|
| F1 | 0.031 | 80 (Shore D) | >2.5 |
| F2 | 0.061 | 88 (Shore A) | <1 |
| F3 | 0.43 | 73 (Shore A) | <1 |
| F4 | 0.81 | 65 (Shore A) | <1 |
| F5 | 0.3 | 57 (Shore A) | <1 |
| F6 | 0.0035 | 90 (Shore A) | >4.5 |
| F7 | 0.011 | 75 (Shore D) | >2 |
| F8 | 0.015 | 78 (Shore D) | >2 |
| F9 | 0.312 | 37 (Shore A) | N.D. |
| F10 | 0.412 | 39 (Shore A) | N.D. |

TABLE 3-continued

Properties of the representative formulations are provided here:

| Formulation | Electrical Conductivity (S/cm) | Hardness | Lap Shear Strength (MPa) |
|---|---|---|---|
| F11 | 3.446 | 39 (Shore D) | 0.6 |
| F12 | 0.915 | 18 (Shore D) | 0.2 |
| F13 | 5.421 | 42 (Shore D) | 0.5 |

N.D.: Not detected

EMI Shielding Measurement: The EMI shielding measurement for the samples of different forms were done as per the IEEE299 standard. The EMI shielding ability of the developed formulations was also checked in the range of 6 GHz to 12 GHz. The sample thickness was between 0.5 mm to 1.5 mm. The EMI shielding effectiveness of the selective sample is shown in Table 4

TABLE 4

EMI Shielding Effectiveness

| Formulation | EMI Shielding |
|---|---|
| F1 | 80 dB |
| F3 | >100 dB |
| F4 | >100 dB |
| F5 | 90 dB |
| F9 | 70 dB |

Thermal Conductivity: The thermal conductivity measurement of the samples was done following the ASTM E1530 standard. The thermal conductivity of the selective sample is shown in Table 5.

TABLE 5

Thermal Conductivity

| Formulation | Thermal Conductivity (W/m-K) |
|---|---|
| F1 | 1.4 |
| F4 | 1.5 |
| F5 | 1.5 |
| F6 | 1.5 |
| F7 | 1.5 |
| F8 | 1.7 |
| F11 | 1.8 |
| F13 | 1.8 |

Comparative Example 1

For drawing the comparison of the hybrid silicone-based formulation to that of the pure organic based comparison, controlled sample (comparative to formulation F7) was made and tested.

TABLE 6

Comparative Example 1

| Formulation No. | Polymer A Label | Polymer A % in formulation | Polymer B Label | Polymer B % in formulation | Filler Label | Filler % in formulation | Electrical Conductivity (S/cm) | EMI Shielding Effectiveness (dB) | Hardness (Shore D) |
|---|---|---|---|---|---|---|---|---|---|
| Control (C) | A1 | 18 | B1 | 12 | f1 | 70 | 0.009 | 42 | 91 |
| F14 | A1 | 22 | B2 | 8 | f1 | 70 | 0.028 | 79 | 80 |

Embodiments of the present technology have been described above and modification and alterations may occur to others upon the reading and understanding of this specification. The claims as follows are intended to include all modifications and alterations insofar as they come within the scope of the claims or the equivalent thereof.

What is claimed is:

1. A curable silicone composition, comprising:
   (i) a hybrid epoxy functional or siloxane epoxy functional polymer A of Formula 1;
   (ii) an amine functional polymer B of Formula 2 comprising one or more amine functional groups; and
   (iii) an electrically conductive filler, wherein the curable silicone composition is an epoxy-amine curing system; and
wherein the cured form of the curable silicone composition is an electrically conductive material, and
wherein the polymer (A) is of Formula 1:

$$(R)_a(W)_b(R)_{a''} \qquad \text{Formula 1;}$$

wherein b is greater than 0, a is equivalent to a", and (a+a") is greater than 1

R can be represented by Formula (1a):

$$(L_1)_c[(CH_2)_d(CH_2O)_eX]_f \qquad \text{Formula (1a)}$$

wherein $L_1$ is a heteroatom independently selected from oxygen or nitrogen, and wherein c, e can be 0 or greater, and d, f is greater than 0, with the proviso that (d+e) is greater than 0;

X is independently selected from any of the functional moieties represented by Formula (1b)

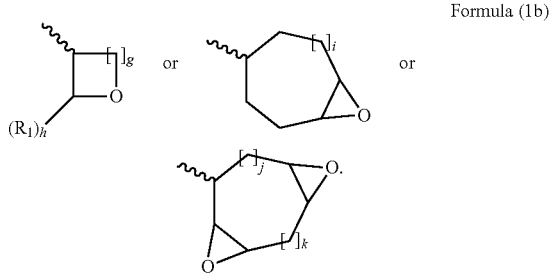

Formula (1b)

wherein g, h, i, are 0 or greater; j and k are 0 or greater with the proviso that (j+k) is greater than 0;
$R_1$ is selected from aliphatic or aromatic substituted hydrocarbons, or un-substituted hydrocarbons, or fluorinated hydrocarbon having 1-20 carbon atoms and optionally connected to an ester;
W of Formula 1 can be represented by Formula (1c)

$$(Y)_l(Z)_m \qquad \text{Formula (1c)}$$

wherein l and m are greater than zero;
Y in formula (1c) is represented by Formula (1d):

$$(M_1)_{n''}(D_1)_n(D_2)_o(T_1)_p(Q_1)_q(M_2)_{n'''} \qquad \text{Formula (1d)}$$

wherein n, o, p, q, n", and n'" are zero or greater with the proviso that n+o+p+q+n"+n'">0;
$M_1$ is selected from Formula (1e):

$$R_2R_3R_4SiO_{1/2} \qquad \text{Formula (1e)}$$

$D_1$ is r selected from Formula (1f):

$$R_5R_6SiO_{2/2} \qquad \text{Formula (1f)}$$

$D_2$ is selected from Formula (1g):

$$R_7R_8SiO_{2/2} \qquad \text{Formula (1g)}$$

$T_1$ is selected from Formula (1h):

$$R_9SiO_{3/2} \qquad \text{Formula (1h)}$$

$Q_1$ is selected from Formula (1i):

$$SiO_{4/2} \qquad \text{Formula (1i)}$$

$M_2$ is selected from Formula (1j):

$$R_{10}R_{11}R_{12}SiO_{1/2} \qquad \text{Formula (1j)}$$

wherein $R_2$-$R_{12}$ are (a) independently selected from R with the proviso that c=0, or (b) $R_2$-$R_{12}$ are independently selected from a monovalent cyclic or acyclic, aliphatic or aromatic, substituted or un-substituted hydrocarbon, or a fluorinated hydrocarbon having $C_1$-$C_{20}$ carbon atoms;
Z is represented by Formula (1k)

$$(A')_r(B')_s \qquad \text{Formula (1k)}$$

where r and s can be zero with the proviso that (r+s) is always greater than zero'
A' is selected from a bis epoxide of Formula (1l)

$$R_{13}(J)_{s''}R_{14} \qquad \text{Formula (1l)}$$

where J is independently selected from $R_{15}$ and $R_{16}$, and s"≥0;
$R_{13}$-$R_{16}$ are independently selected from a monovalent cyclic or acyclic, aliphatic or aromatic, substituted or un-substituted hydrocarbon, or a fluorinated hydrocarbon having 1-20 carbon atoms:
B' is selected from a structure of Formula (1m):

$$(CH_2)_t[(CHOH)_u((CHR_{17})(CH_2)_vO))_w((CH_2)_xL_2)_y \\ R_{18}R_{19}R_{20}CR_{21}]_z \qquad \text{Formula (1m)}$$

wherein $R_{17}$-$R_{21}$ can be independently selected from a monovalent cyclic or acyclic, aliphatic or aromatic, substituted or un-substituted hydrocarbon, hydrogen, or a fluorinated hydrocarbon having $C_1$-$C_{20}$ carbon atoms, $L_2$ is a heteroatom independently selected from oxygen or nitrogen, and t, u, v, w, x, y, z is an integer with the proviso that t+u+v+w+x+y+z>0;

the polymer B is of the Formula 2:

$$(R')_{a'}(W')_{b'}(R')_{a'}$$  Formula (2)

wherein a' and b' are independently 0 or greater, with the proviso that (a'+b') is greater than 0, R' is of the Formula (2a):

$$(CH_2)_{c'}(OCH_2CHR_{22})_{d'}(R_{23}L_3R_{24})_{e'}$$  Formula (2a)

wherein c' and e' are independently greater than 0, and d' can be zero or greater with the proviso that c'+d'+e'>0;
$L_3$ is nitrogen, and $L_3$ can be 0 or greater
$R_{22}$-$R_{24}$ is independently selected from hydrogen, monovalent cyclic or acyclic, aliphatic or aromatic, substituted or un-substituted hydrocarbon, or a fluorinated hydrocarbon having $C_1$-$C_{20}$ carbon atoms,
$R_{23}$, $R_{24}$ are independently 0 or greater, with the proviso that ($R_{23}$+$R_{24}$) is greater than 0,
W' is of the Formula (2b):

$$(Y')_{f'}(Z')^{g'}$$  Formula (2b)

where f' and g' is 0 or greater, and (f'+g') is greater than 0;
Y' is of the Formula 2c:

$$(M_3)_{r'}(D_3)_{h'}(D_4)_{i'}(T_2)_{j'}(Q_2)_{k'}(M_4)_{s'}$$  Formula (2c)

where h', i', r', s', j' and k' can be zero or greater with the proviso that (h'+i'+r'+s'+j'+k')>0,
$M_3$ is selected from Formula (2d):

$$R_{25}R_{26}R_{27}SiO_{1/2}$$  Formula (2d)

$D_3$ is selected from Formula (2e)

$$R_{28}R_{29}SiO_{2/2}$$  Formula (2e)

$D_4$ is selected from Formula (2f):

$$R_{30}R_{31}SiO_{2/2}$$  Formula (2f)

$T_2$ is selected from Formula (2g):

$$R_{32}SiO_{3/2}$$  Formula (2g)

$Q_2$ is selected from Formula (2h)

$$SiO_{4/2}$$  Formula (2h)

$M_4$ is selected from Formula (2i):

$$R_{33}R_{34}R_{35}SiO_{1/2}$$  Formula (2i)

$R_{25}$-$R_{35}$ are independently selected from R', hydrogen, a hydroxyl radical, a monovalent cyclic or acyclic, aliphatic or aromatic, substituted or un-substituted hydrocarbon, or a fluorinated hydrocarbon having $C_1$-$C_{20}$ carbon atoms;
Z' is of the Formula (2j):

$$R_{36}L_4(CH_{l'})_m R_{37}L_5(CH_{n'})_o L_6R_{38}(CH_{p'})_{q'}$$  Formula (2j)

where Z' is linear or cyclic;
$R_{36}$-$R_{38}$ are independently selected from R' or hydrogen, a monovalent cyclic or acyclic, aliphatic or aromatic, substituted or un-substituted hydrocarbon, or a fluorinated hydrocarbon having $C_1$-$C_{20}$ carbon atoms or halogen optionally connected via heteroatoms,
$L_4$, $L_5$, or $L_6$ is a heteroatom independently selected from oxygen or nitrogen,
$L_4$, $L_5$, or $L_6$ can be 0 or greater, with the proviso that ($L_4$+$L_5$+$L_6$) is ≥0, and
l', m', n', o', p', q' are independently selected from a positive integer with the proviso that l'+m'+n'+o'+p'+q'>0.

2. The curable silicone composition of claim 1, wherein the one or more amine functional groups of polymer B is situated in the terminal positions, pendant position, or both in the terminal position and pendant position.

3. The curable silicone composition of claim 1, wherein the polymer A is present in a range from about 5% to about 60% by weight based on the total weight of the composition.

4. The curable silicone composition claim 1, wherein the polymer B is present in a range from about 5% to about 30% by weight based on the total weight of the composition.

5. The curable silicone composition of claim 1, wherein the electrically conductive filler is selected from the group consisting of graphite, graphene, metal coated graphite, metal coated graphene, aluminum powder, copper powder, bronze powder, brass powder, fibers or whiskers of carbon, graphite, silicon carbide, silicon nitride, silver, zinc oxide, carbon nanotubes, boron nitride nanosheets, zinc oxide nanotubes, black phosphorous, silver coated aluminum, silver coated glass, silver plated aluminum, nickel plated silver, nickel plated aluminum, carbon black of different structures, monel mesh and wires, or combinations of two or more thereof.

6. The curable silicone composition of claim 5, wherein the weight ratios of the electrically conductive filler added to the composition is in a range from about 5% to 80% by weight based on the total weight of the composition.

7. The curable silicone composition of claim 1, wherein the polymer B is selected from a linear polymer, a branched polymer, or a cyclic structure.

8. The curable silicone composition of claim 1, wherein the polymer B is a branched polymer.

9. The curable silicone composition of claim 1, further comprising a catalyst or a supported catalyst selected from an acid, a base, a Lewis acid, an ammonium salt, or a combination of two or more thereof.

10. The curable silicone composition of claim 1, further comprising adhesion promoters selected from a group consisting of trialkoxy epoxy silane, a trialkoxy primary amino silane, a combination of a primary and a secondary amine containing trialkoxy silane, a tris-(trialkoxy) isocyanurate based silane, an alkylthiocarboxylated trialkoxy silane, alkenyl silane, acrylated silane, acrylated alkoxysilane, fumarate based alkoxysilane, carboxyl functional silane, expoxy-vinylsilane, hydroxy functional organosilane, anhydride functional silane, amide functional alkoxy silane, titanates, zirconates, organic anhydrides and carboxylates, halogenated organic compound, organic acrylates or a combination of two or more thereof.

11. The curable silicone composition of claim 1, further comprising a reactive diluent selected from the group consisting of a substituted glycidyl ether, hexane, heptane, a polydiorganosiloxane, or a combination of two or more thereof.

12. The curable silicone composition of claim 1, further comprising a rheology modifier, selected from the group consisting of an alkane, a silanes, a silicone, an acrylic copolymer, a glycol, a polyol, an ether, an ester, a polyester, an alcohol, an amide, a polyamide, an amine, a polyamine, an imine, a polyimine, a urethane, a polyurethane, a ketone, a polyketone, a saccharides, a polysaccharides, a cellulose, a fluorocompound, a thermoplastic or thermosetting resins, a polyvinyl compound, a synthetic or natural oil, a naturally occurring additive, guar, xanthane, an alginate, a lactate, a lactide, an anhydride, a gum, a silicate, a borate, an oxide, a sulfide, a sulfate, or a combination of two or more thereof.

13. A cured material formed from the composition of claim 1.

14. The cured material of claim 13, wherein the cured material is thermally conductive, electrically conductive, or a combination thereof.

15. The cured material of claim 13, wherein the cured material has an electromagnetic interference (EMI) shielding efficiency between 50 to 170 dB.

16. The cured material of claim 13, wherein the cured material is in the form of a coating, an adhesive, a sealant, an electrode, an ink, a thermally conductive material, an electrically conductive material, a sensor, an actuator, a heating pad, an antibacterial packaging material, a conductive plastic, or an electromagnetic shielding material.

17. A method of making a silicone composition comprising mixing the composition of claim 1, homogenizing the mixture to form a homogenized mixture, and curing the homogenized mixture by epoxy-amine curing, wherein polymer A and polymer B are silicone polymers.

18. A method of making a silicone composition of claim 1, comprising:
   (i) mixing Polymer A, Polymer B, and one or more electrically conductive filler(s) together with respect to epoxy equivalent weight of the polymer A and amine equivalent weight of polymer B to form a mixture:
   (ii) homogenizing the mixture to form a homogenized mixture; and
   (iii) curing the homogenized mixture by epoxy-amine curing, wherein the polymer A and polymer B are silicone polymers, and at least one of the polymer A and polymer B is a hybrid polymer.

19. The curable silicone composition of claim 1, wherein the electrically conductive filler is present in a range of from about 60% to about 80% by weight based on the total weight of the composition.

* * * * *